United States Patent
Moriya et al.

(10) Patent No.: US 11,146,128 B1
(45) Date of Patent: Oct. 12, 2021

(54) SQUIRREL-CAGE ROTOR AND ROTATING ELECTRIC MACHINE

(71) Applicant: Mitsubishi Electric Corporation, Tokyo (JP)

(72) Inventors: Hiroaki Moriya, Tokyo (JP); Shogo Iguchi, Tokyo (JP); Yoshiharu Takashima, Tokyo (JP); Moriyuki Hazeyama, Tokyo (JP); Takahiro Mizuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/262,203

(22) PCT Filed: Sep. 13, 2018

(86) PCT No.: PCT/JP2018/034016
§ 371 (c)(1),
(2) Date: Jan. 22, 2021

(87) PCT Pub. No.: WO2020/054029
PCT Pub. Date: Mar. 19, 2020

(51) Int. Cl.
*H02K 1/26* (2006.01)
*H02K 7/00* (2006.01)

(52) U.S. Cl.
CPC .............. *H02K 1/26* (2013.01); *H02K 7/003* (2013.01)

(58) Field of Classification Search
CPC .................................. H02K 1/25; H02K 7/003
See application file for complete search history.

(56) References Cited

U.S. PATENT DOCUMENTS

2014/0292135 A1    10/2014    Arimatsu

FOREIGN PATENT DOCUMENTS

| CN | 104079089 A | 10/2014 |
| CN | 106451982 A | 2/2017 |
| JP | 50-26721 B1 | 9/1975 |
| JP | 63-217957 A | 9/1988 |
| JP | 6-253511 A | 9/1994 |
| JP | 2000-014105 A | 1/2000 |
| JP | 2014-176113 A | 9/2014 |
| JP | 2014-209838 A | 11/2014 |

(Continued)

OTHER PUBLICATIONS

Japanese Decision to Grant a Patent dated Sep. 10, 2019 in Japanese Application No. 2019-504366.

(Continued)

*Primary Examiner* — Terrance L Kenerly
(74) *Attorney, Agent, or Firm* — Xsensus LLP

(57) ABSTRACT

A squirrel-cage rotor includes a slot having an outside circumference edge which is near the outer side of the rotor iron core and has a first corner at one end and a second corner at the other end and whose shape expands toward the outer side beyond a first virtual circle that connects the first corner and the second corner and is concentric with the rotor iron core. It also has an inside circumference edge which is near the inner side and has a third corner having a curvature radius smaller than that of the first corner at one end and a fourth corner having a curvature radius smaller than that of the second corner at the other end and whose shape expands toward the outer side beyond a second virtual circle that connects the third corner and the fourth corner and is concentric with the rotor iron core.

9 Claims, 10 Drawing Sheets

(56) References Cited

FOREIGN PATENT DOCUMENTS

TW          200937806  A     9/2009
WO      2017/200093  A1    11/2017

OTHER PUBLICATIONS

Japanese Notice of Reasons for Refusal dated May 14, 2019 in Japanese Application No. 2019-504866.
International Search Report and Written Opinion dated Nov. 20, 2018, received for PCT Application PCT/JP2018/034016, Filed on Sep. 13, 2018, 8 pages including English Translation.
First Examination Opinion Notice dated Mar. 3, 2020, received for TW Application 108132005, 8 pages including English Translation.

SQUIRREL-CAGE ROTOR AND ROTATING ELECTRIC MACHINE

CROSS-REFERENCE TO RELATED APPLICATION

The present application is based on PCT filing PCT/JP2018/034016, filed Sep. 13, 2018, the entire contents of which are incorporated herein by reference.

TECHNICAL FIELD

The present disclosure relates to a squirrel-cage rotor and a rotating electric machine provided therewith.

BACKGROUND ART

In recent years, it is required to reduce a take time in machining for industrial-use rotating electric machines, and it is also required therefor to perform machining of difficult-to-cut materials; therefore, it is extremely required to improve efficiencies of motors and to operate them at higher rotation speeds.

Although induction type electric rotating machines, which are robust and sturdy, are often used for industrial-use rotating electric machines, it is necessary for the rotor iron core with rotor secondary conductors to avoid deformation due to the centrifugal force which occurs at the time of rotation in order for the induction type electric rotating machine to operate at a high rotation speed.

Besides, since the current theoretically flows in the rotor of the induction type rotating electric machine, it is a big issue to control the heat generation at the rotor due to the current in order to improve the efficiency of the motor, which means it is necessary to reduce the resistance of the rotor secondary conductors where the current flows.

In order to reduce the maximum stress at the peripheries of rotor slots which occurs because of the centrifugal force due to high speed rotation, one of conventional rotors has slots whose dimensions along the rotor circumference are relatively long (see Patent Document 1, for example), and another thereof has slots whose radially inner edges are expanded toward radially inner sides and whose radially outer edges are expanded toward radially outer sides (see Patent Document 2, for example).

PRIOR ART DOCUMENTS

Patent Documents

Patent Document 1: Unexamined Patent Application Publication JP, H06-253511, A
Patent Document 2: Unexamined Patent Application Publication JP, 2014-209838, A

SUMMARY OF THE INVENTION

Problems to be Solved by the Invention

However, when the slots with relatively long dimensions along the circumference are formed like the rotor described in Patent Document 1, bridge parts, which are remaining parts between the slots and the circumference of the rotor iron core, are relatively long along the circumference. Since the centrifugal force acts on a conductor bar, which is the secondary conductor, when the rotor rotates, the longer bridge part dimension means the part where a force acts on the bridge due to the centrifugal force which acts on the conductor bar becomes wider, and thereby the part along the circumference where the stress occurs in the bridge part becomes wider. Therefore, the lack of sufficient whole bridge part dimensions for the rotation speed would cause the poor strength, which means it is necessary for each bridge part to have its certain radial dimension. However, if the bridge part has excessively long radial dimension, the leakage flux increases to cause the efficiency degradation, the leakage flux being part of magnetic flux which originates from the stator and passes through the bridge part not linking with a conductor bar to connect to the stator.

Furthermore, a shaft is joined to the inner face of the rotor to transmit torque from the rotor by a thermal insertion, a press fitting, or the like, and a high rotation-speed rotor is required to be connected to a shaft with a larger diameter to certainly keep its rigidity. However, if the rotor iron core has a large inner diameter, the radial distance (back yoke) between the slot bottom and the inner face diameter is small, which causes the core to be easily deformed due to a centrifugal force occurring at the time of high-speed rotation. This makes the interference for the thermal insertion, the press fitting, etc with the shaft small, causing a problem in torque transmission through the shaft.

In order to prevent the deformation, it is effective for a rotor to have a sufficient back yoke length for improving its rigidity. However, it is difficult to keep a sufficient length since the slot whose radially inner edge is expanded toward radially inner side and whose radially outer edge is expanded toward radially outer side has the radially inner edge which expands toward the inner side like the rotor described in Patent Document 2. On the other hand, in a case where the slot area is reduced to keep the back yoke length without changing the slot shape, the reduction of the slot area causes an increase of the resistance of the secondary conductors, which leads to the efficiency deterioration.

An object of the present disclosure is to solve the above-mentioned problems by providing a squirrel-cage rotor and a rotating electric machine provided therewith, the rotor being hard to be deformed by stress to keep its rigidity around the slots, the rotor having low resistance of its secondary conductors.

Solution to the Problems

In order to solve the above-mentioned problems to achieve the object, a squirrel-cage rotor according to the present disclosure includes: a rotor iron core that has a cylindrical shape, the rotor iron core being a group of laminations of circular plate parts, each of the circular plate parts having its circular hole at its center, the circular plate parts being stacked in the axial direction with the shaft passing through their circular holes, the rotor iron core having more than one slot which is arranged at regular intervals along a circumference side of the rotor iron core, the slot extending along the axial direction. The slot has: an outside circumference edge which is positioned near an outer side of the rotor iron core, the outside circumference edge having a first corner at its one end, the outside circumference edge having a second corner at the other end thereof, the outside circumference edge having a shape which expands toward the outer side beyond a first virtual circle, the first virtual circle connecting the first corner and the second corner, the first virtual circle being concentric with the rotor iron core; an inside circumference edge which is positioned near an inner side of the rotor iron core, the inside circumference edge having a third corner at its one end, the inside circumference edge having a fourth corner at the other end thereof, the third corner having a curvature radius smaller than that of the first corner, the fourth corner having a curvature radius smaller than that of the second corner, the inside circumference edge having a shape which expands toward the outer side beyond a second virtual circle, the second virtual circle connecting the third corner and the fourth corner, the second virtual circle being concentric with the rotor iron core; a first side edge which connects the first corner and the third corner; and a second side edge which connects the second corner and the fourth corner. A rotating electric machine according to the present disclosure includes the above squirrel-cage rotor.

Advantages of the Invention

In a squirrel-cage rotor according to the present disclosure, it is possible to prevent deformation due to stress which occurs in the stacked iron core of the rotor, to increase its rotation speed, and to reduce the resistance of the secondary conductor, which thereby improves the rotation efficiency.

Since a rotating electric machine according to the present disclosure is provided with the squirrel-cage rotor above, it is possible to improve the rotation efficiency.

EMBODIMENTS

The followings are detailed descriptions of squirrel-cage rotors according to embodiments of the present disclosure and rotating electric machines provided therewith using the drawings. A component common to more than one embodiment is given a common symbol and the same description therefor is omitted. The embodiments do not limit the disclosure.

Embodiment 1

Figure 1:
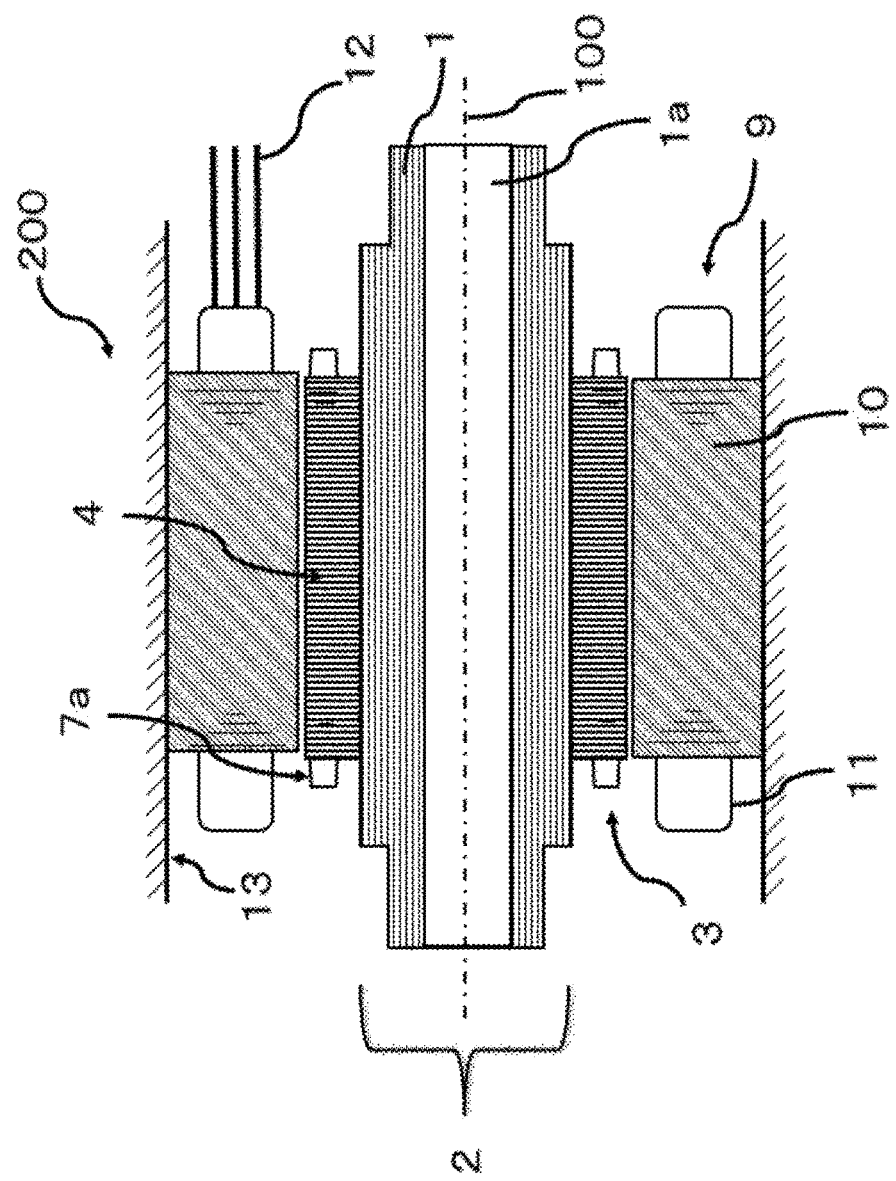
FIG. 1 is a schematic cross-sectional view showing part of a rotating electric machine according to an embodiment of the present disclosure.

FIG. 1 is a schematic cross-sectional view showing part of a rotating electric machine 200 according to Embodiment 1 of the present disclosure. The rotating electric machine 200 includes a housing 13, a shaft 1 supported by the housing through bearings to be able to rotate, a rotor 3 disposed outside the shaft 1, and a stator 9 disposed outside the rotor 3 so as to face the rotor with an air gap between them. The rotor 3 is a rotor for an electric rotating machine of an induction motor (IM) whose rotor iron core 4, which is stacked laminations, is provided with short-circuit rings 7a at its both ends each.

To the penetrating hole 2 of the rotor 3 penetrating the rotor in the direction of its rotation axis 100, the shaft 1 according to the shape of the penetrating hole 2 is fixed by thermal shrink fit, press fit, a combination of press fit and thermal shrink fit, a combination of press fit and cooling shrink fit, or the like. The shaft 1 shown in FIG. 1 and FIG. 2 has a hollow hole 1a; however, the shaft is not limit thereto, and the shaft may be a solid shaft whose inside is solid.

Figure 3:
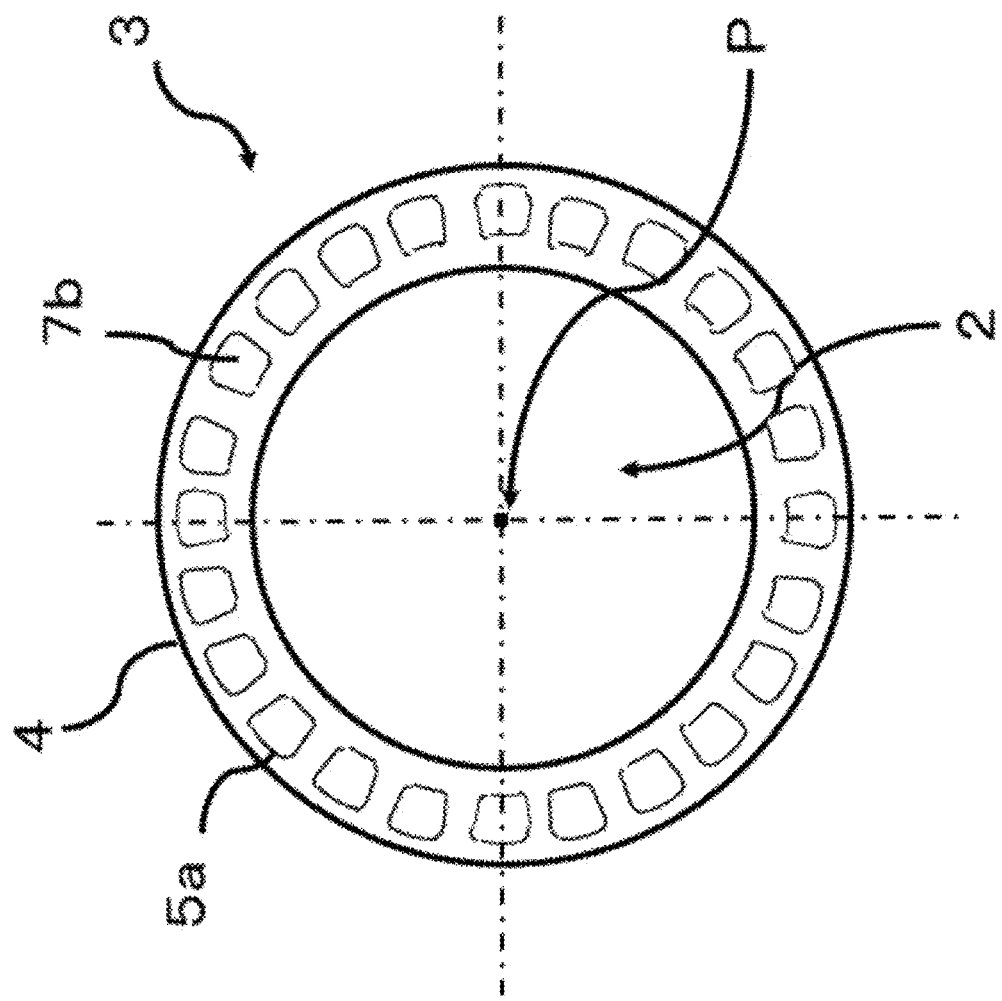
FIG. 3 is a schematic cross-sectional view showing a squirrel-cage rotor according to Embodiment 1 of the present disclosure.

The rotor iron core 4 has a cylindrical shape and consists of stacked laminations, a piece of the lamination being a circular plate part with a circular hole at its center, pieces of the laminations being stacked along the rotation axis 100 of the shaft 1 with their circular holes aligned, a piece of the lamination being made by, for example, press-blanking of an electromagnetic steel plate, which is a thin steel plate. As shown in FIG. 3, plural slots 5a are provided near the outer side of the rotor iron core 4 at regular intervals along the circumference. The slots 5a are surrounded by the outside rim of the rotor iron core 4 and have no slot openings, i.e. the slots are closed slots. A conductor bar 7b is inserted into the inner space of a slot 5a. In order to prevent the conductor bar 7b from being thrown away to outside by centrifugal force, each end of the conductor bar 7b has its own short-circuit ring 7a. The conductor bar 7b and the short-circuit ring 7a are formed by die-casting using conductive material such as aluminum, or aluminum alloy. Note that copper or copper alloy, which has low electrical resistance than iron, may be used for a conductive material of the plate part.

The stator 9 includes a stator core 10 and a plurality of coils 11 which are located at regular intervals along the circling direction of the stator core 10. The stator core 10 is formed by stacking thin plates of, for example, electromagnetic steel plates. The plurality of coils 11 receives electricity through power lines 12 connected to a power source, which is not shown in the drawings, placed outside the rotating electric machine 200, to work.

Figure 2:
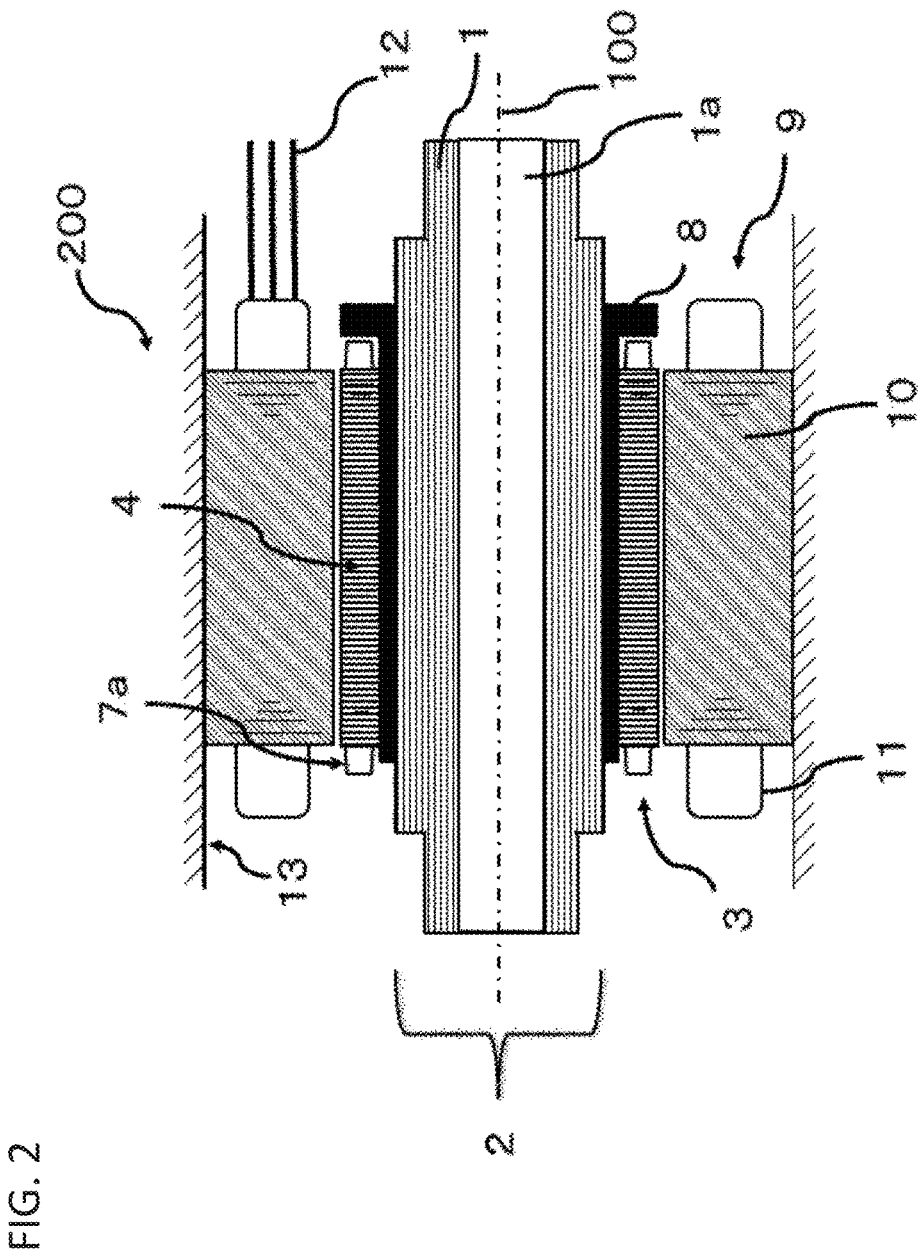
FIG. 2 is a schematic cross-sectional view showing part of the rotating electric machine in FIG. 1 with a sleeve added thereto.

FIG. 2 is a schematic cross-sectional view showing part of the rotating electric machine 200 according to the present embodiment with a sleeve 8 added between the shaft 1 and the rotor 3. The shaft 1 is, as mentioned above, fixed to the rotor 3 by thermal shrink fit, press fit, a combination of press fit and thermal shrink fit, a combination of press fit and cooling shrink fit, or the like. However, if the shape of the shaft 1 is not suitable for these fixing methods, it is possible to take another way with sleeve, the rotor 3 being fixed to the sleeve 8 first in this way with sleeve by thermal shrink fit, press fit, a combination of press fit and thermal shrink fit, a combination of press fit and cooling shrink fit, or the like, the sleeve 8 next being fixed to the shaft 1 by a screw or oil pressure. Hence the addition of the sleeve 8 makes the manufacturing easier. In addition, the sleeve 8 can be applied in a case where the structure for the shaft 1 to be able to be attached to and detached from the rotor 3 is likely to be adopted.

FIG. 3 is a cross-sectional view showing the squirrel-cage rotor according to the embodiment of the present disclosure illustrated at a cross-sectional plane orthogonal to the rotation axis 100. In the rotor iron core 4, a plurality of slots 5a are located at regular intervals along the circumference. Between neighboring slots 5a, there is a tooth part provided for magnetic flux from the stator 9 to pass through. Each of the slots 5a has the same shape. The center of the rotor iron core 4 is referred as a center point P.

Figure 4:
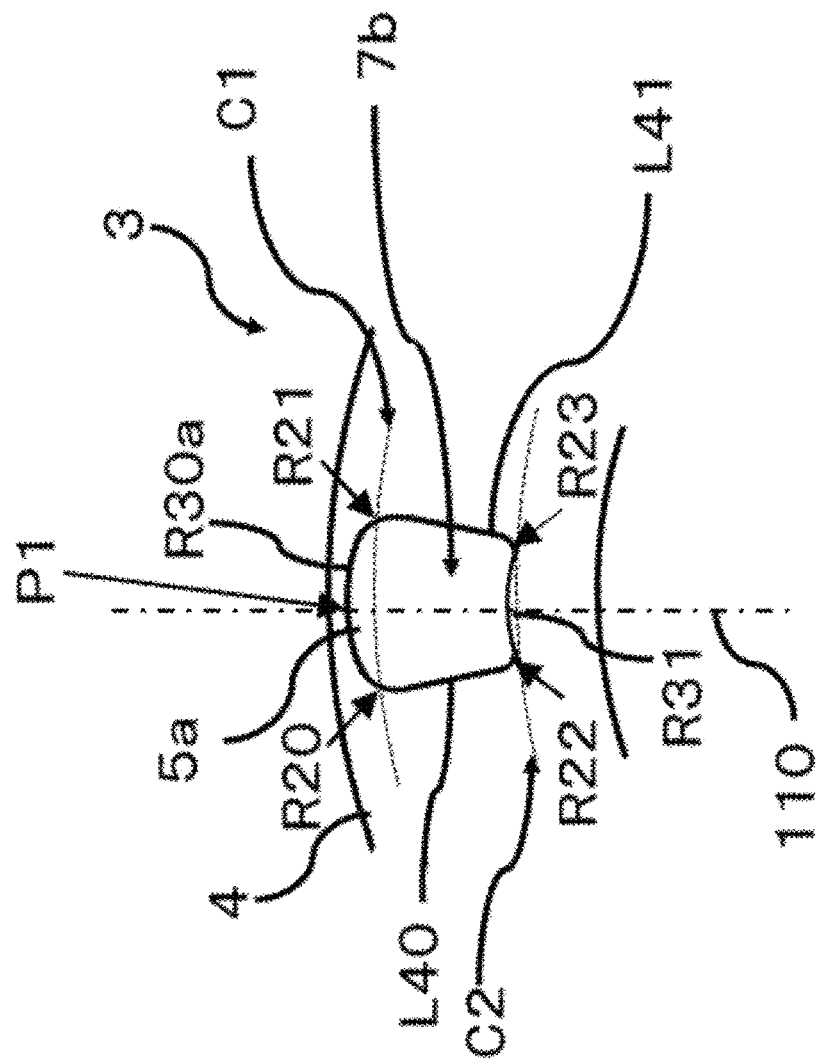
FIG. 4 is a magnified view of part of the rotor in FIG. 3.

FIG. 4 is a magnified cross-sectional view showing part of the squirrel-cage rotor according to Embodiment 1 of the present disclosure. The cross sectional figure of each slot 5a has four parts; the first one is an outside circumference edge R30a near the outer side of the rotor iron core 4, the second and the third parts are side edges L40 and L41 which are straight line parts lying in radial directions from both ends of the outside circumference edge R30a, and the fourth part is an inside circumference edge R31 located near the inner side connecting the side edges L40 and L41.

In detail, the outside circumference edge R30a has a first corner R20 at its one end and a second corner R21 at the other end thereof. It has a shape which expands toward the outer side beyond a circle that is concentric with the rotor iron core, i.e. a virtual circumference C1 whose center is the center point P and which connects the first corner R20 and the second corner R21. The inside circumference edge R31 is disposed inside the outside circumference edge R30a and has a third corner R22 at its one end and a fourth corner R23 at the other end thereof. It has a shape which expands toward the outer side seen from a circle that is concentric with the rotor iron core, i.e. a virtual circumference C2 whose center is the center point P and which connects the third corner R22 and the fourth corner R23. In addition, the third corner R22 and the fourth corner R23 have curvature radiuses smaller than both of those of the first corner R20 and the second corner R21.

A first side edge L40 which is a straight-line part extending along the radial direction connects the first corner R20 and the third corner R22. Similarly, a second side edge L41 which is a straight-line part extending along the radial direction connects the second corner R21 and the fourth corner R23. The shape of the slot 5a has lateral symmetry about the center line 110 which passes the center of the rotor iron core 4 and an apex P1 that is the midpoint of the outside circumference edge R30a.

Figure 5:
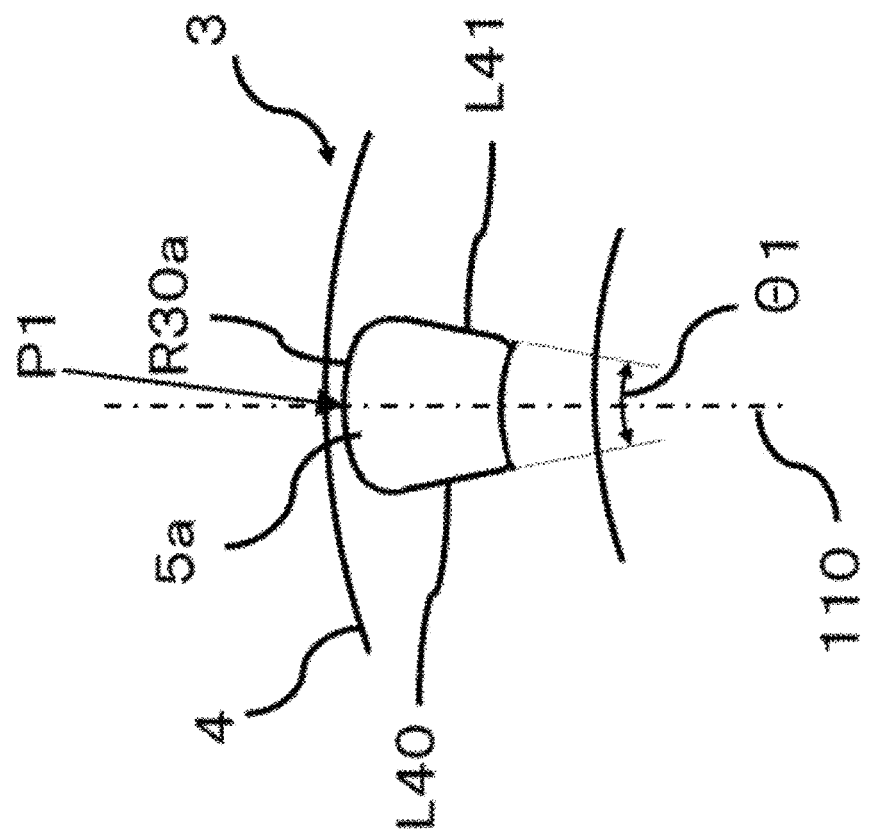
FIG. 5 is a magnified view of part of the rotor of FIG. 4 to illustrate an angle that one side edge of a slot of the rotor makes with the other side edge thereof.

FIG. 5 is a cross-sectional view showing part of the squirrel-cage rotor according to Embodiment 1 of the present disclosure. When the angle that the first side edge L40 makes with the second side edge L41 is denoted by $\theta 1$, $\theta 1$ is expected to satisfy the relation "0 degree$\leq \theta 1 \leq$90 degrees".

Figure 6:
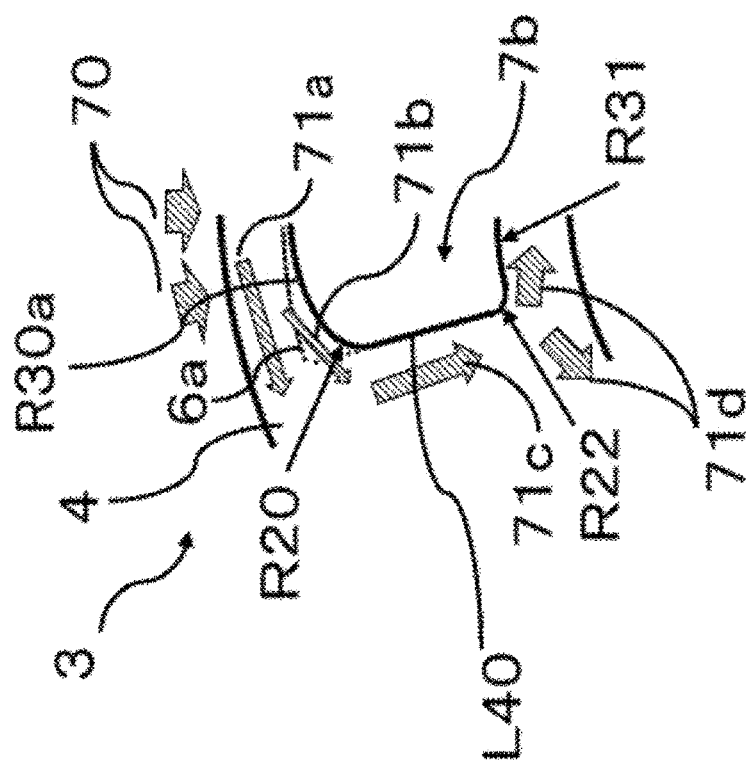
FIG. 6 is a magnified view of part of the squirrel-cage rotor according to Embodiment 1 of the present disclosure to describe the principle of the way it works.

FIG. 6 is an illustration to describe the principle of the way the squirrel-cage rotor according to Embodiment 1 of the present disclosure works and is a magnified cross-sectional view showing part of the squirrel-cage rotor. The directions of the magnetic flux flows are illustrated by arrows therein. Magnetic flux whose origin is the stator 9 is named magnetic flux 70. In a part where a slot exists, magnetic flux flowing near the outer side of the rotor 3 is named magnetic flux 71a, magnetic flux to flow in part of a fan-shaped slot 6a, which is an example for comparison to be described later, is named magnetic flux 71b, magnetic flux flowing in a tooth part of the rotor iron core 4 is named magnetic flux 71c, and magnetic flux flowing in back yoke part of the rotor iron core 4 is named magnetic flux 71d.

Here, the way the shape of the slot affects the magnetic flux flows is described by using a fan-shaped slot 6a which is illustrated with dotted lines in FIG. 6 as an example for comparison. The fan-shaped slot 6a has an almost straight-line-shaped outside circumference edge compared with that, R30a, of the slot 5a. It means the position of its "first corner" is closer to the outer side of the rotor iron core 4 than that, R20, of the slot 5a, hence the radial dimension of the bridge part for the slot 6a is short compared with the slot 5a, the radial dimension of the bridge part being the radial distance between the "first corner" and the outer side of the rotor 3.

In case the magnetization in the bridge part for the fan-shaped slot 6a is nearly saturation, the magnetic flux 71b occurs in addition to the magnetic flux 71a by the effect of the magnetic flux 70 which originates from the stator 9, the fan-shaped slot 6a having a simple shape, the bridge part for the fan-shaped slot 6a having the radial dimension that is the radial distance between the outer side of the rotor 3 and one apex of the outside circumference edge of the fan-shaped slot 6a. This decreases the amount of effective magnetic flux to produce the torque. It also lowers the rotation efficiency because the magnetic flux 71b causes the secondary-circuit copper loss by harmonics, the loss being that of the conductor bar 7b, the conductor bar being provided in the slot.

On the other hand, for the slot 5a of the squirrel-cage rotor according to Embodiment 1 of the present disclosure, the magnetic flux 71b is small since the bridge part radial dimension is broad, which is because the first corner R20 and the second corner R21 are positioned radially inner side compared with those of the fan-shaped slot 6a of an example for comparison as a result of the design of the shape of the outside circumference edge R30a by taking the optimum flow for the magnetic flux 70 into account, the outside circumference edge R30a having a shape which expands toward the outer side beyond the virtual circle that connects the first corner R20 and the second corner R21, the bridge part radial dimension being the radial distance between the outer side of the rotor iron core 4 and the outside circumference edge R30a. In other words, it is possible for the magnetic flux 71c and the magnetic flux 71d to occur with relatively weak magnetic flux in the slot 5a, i.e. in the conductor bar 7b, which thereby improves the rotation efficiency without making the secondary-circuit copper loss by harmonics occur in the conductor bar 7b.

Besides, the third corner R22 and the fourth corner R23 of the slot 5a have curvature radiuses smaller than those of the first corner R20 and the second corner R21 thereof. In this structure, the first side edge L40 and the second side edge L41 of the slot 5a are designed so that their extensions toward the center of the rotor 3 will intersect, which thereby makes the magnetic flux 71c efficiently turn to the magnetic flux 71d to improve the rotation efficiency.

Figure 7:
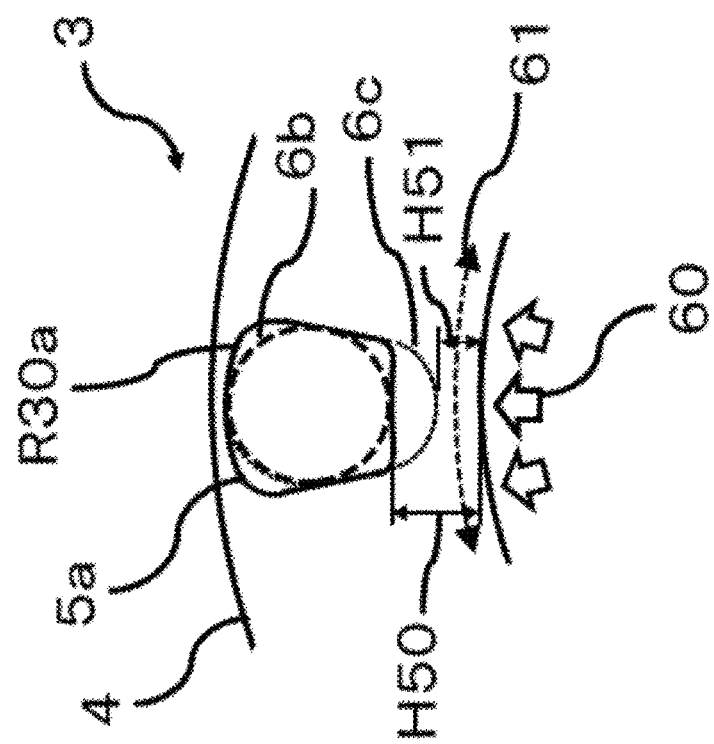
FIG. 7 shows slot examples of a round type and an oval type to be compared with the slot of the squirrel-cage rotor according to Embodiment 1 of the present disclosure.

FIG. 7 shows the slot 5a of the squirrel-cage rotor according to Embodiment 1 of the present disclosure with examples for comparison, a round type slot 6b and an oval type slot 6c, which are conventional ones. The oval slots 6c are generally skewed by a specific angle around the rotation axis 100 to be positioned parallelly. As shown in FIG. 7, it is certain for the slot 5a to have a back-yoke length 1150 longer than a back-yoke length 1151 of the oval slot 6c and for the slot 5a to have the slot cross-sectional area larger than that of the round slot 6b.

As a result of this cross-sectional shape of the slots, it is possible to reduce the resistance of the conductor bars 7b due to sufficient slot areas with sufficient rotor rigidity kept against stress 61 which occurs in the rotor iron core 4, the stress being caused by distortion 60 of the rotor iron core 4 which arises when the rotor 3 rotates or when the shaft 1 is inserted. This makes the heat generation in the rotor 3 small, which improves the rotation efficiency.

As described above, the squirrel-cage rotor according to Embodiment 1 of the present disclosure has slots whose shapes are like that of the slot 5a, which makes it possible to keep the rigidity of the rotor iron core 4 for the rotor iron core 4 not to be damaged by the slots having their sufficient back yoke lengths.

Furthermore, it also reduces the magnetic flux in the conductor bar 7b, which makes the secondary-circuit copper loss by harmonics be small. Moreover, keeping the sufficient slot cross-sectional area makes it possible to reduce the resistance of the conductor bar 7b. This makes the heat generation in the rotor 3 small, which leads to the improvement of the rotation efficiency.

Embodiment 2

Figure 8:
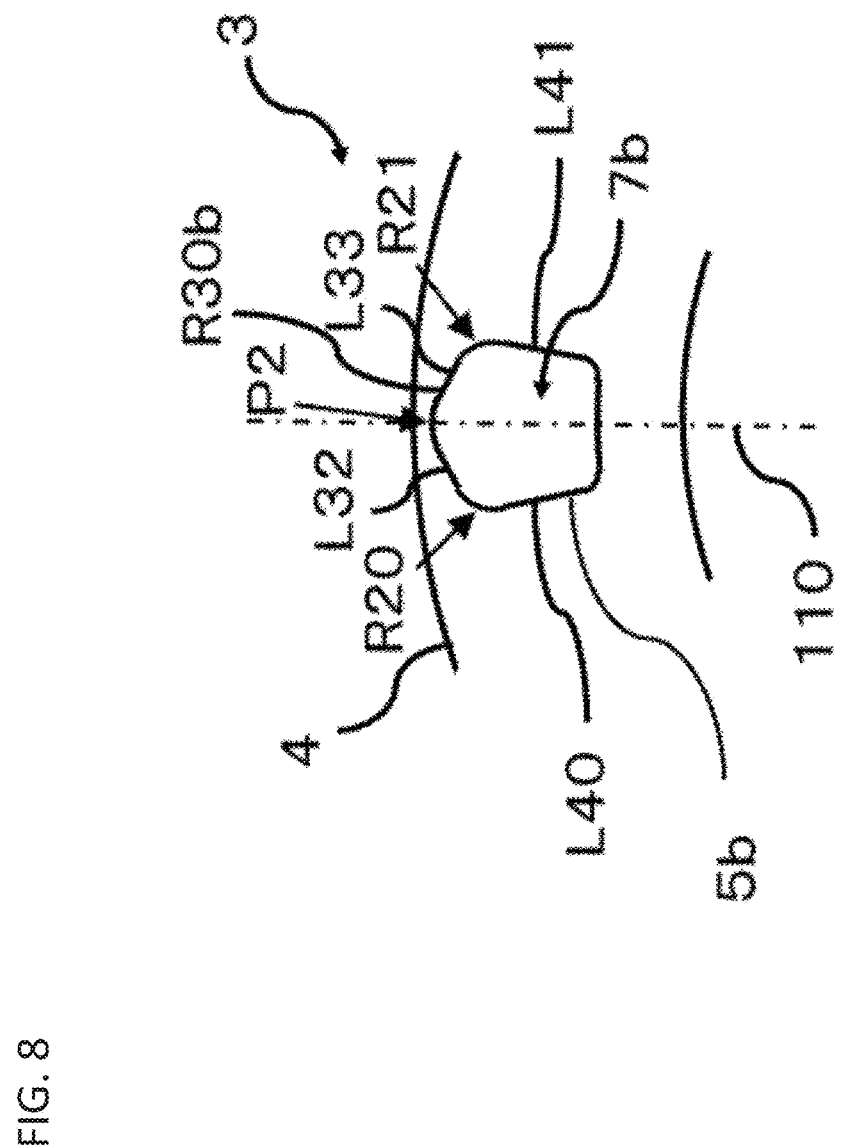
FIG. 8 is a magnified view showing part of a squirrel-cage rotor according to Embodiment 2 of the present disclosure.

FIG. 8 is a magnified cross-sectional view showing part of a squirrel-cage rotor according to Embodiment 2 of the present disclosure. The slot 5b of the squirrel-cage rotor according to Embodiment 2 of the present disclosure has the outside circumference edge whose shape is different from that of the slot 5a of Embodiment 1, the outside circumference edge connecting between the first corner R20 and the second corner R21.

The shape of the slot 5b has lateral symmetry about the center line 110 which passes the center of the squirrel-cage rotor and an apex P2 that is the midpoint of the outside circumference edge R30b. The slot 5b includes a first straight part L32 which connects the first corner R20 and a top part P2 part of the outside circumference edge R30b and a second straight part L33 which connects the second corner R21 and the top part P2 part of the outside circumference edge R30b.

Figure 9:
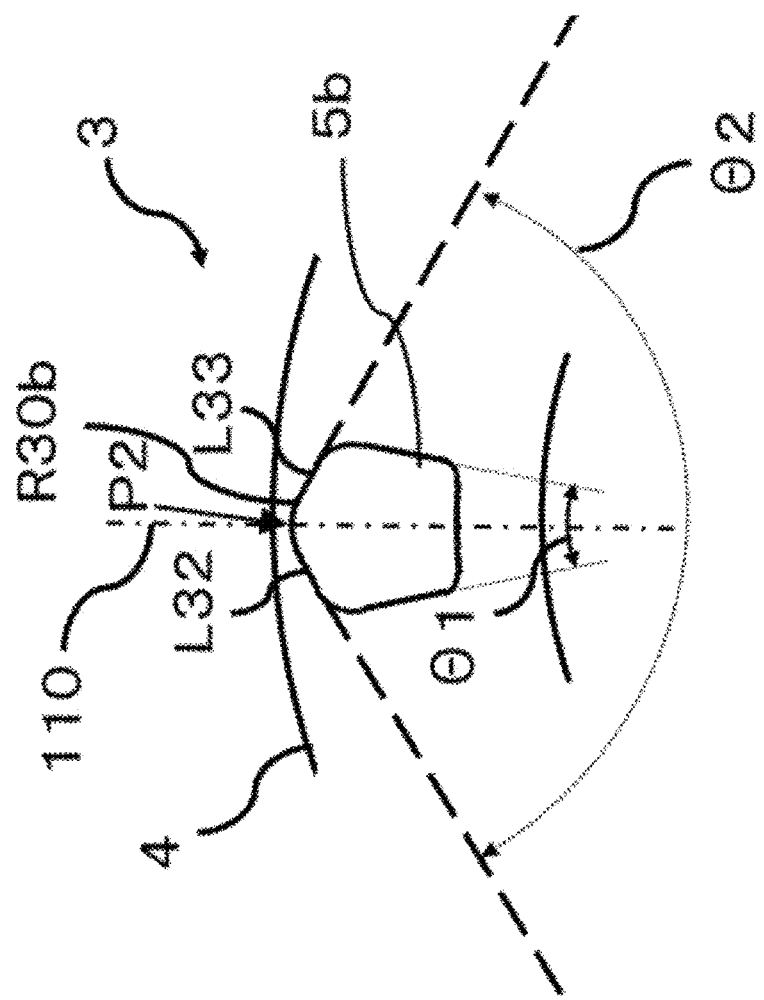
FIG. 9 is a magnified view of part of the rotor of FIG. 8 to illustrate an angle formed by straight lines of outer-side edges of a slot of the rotor and an angle formed by side edges of the slot.

FIG. 9 is a magnified cross-sectional view showing part of the squirrel-cage rotor according to Embodiment 2 of the present disclosure. When the angle that the first straight part L32 makes with the second straight part L33 is denoted by θ2, θ2 is expected to satisfy the relation "90 degrees≤θ2≤" the curvature radius of the outside circumference edge R30b of the slot 5a''''.

In case the outside circumference edge R30b includes the first straight part L32 and the second straight part L33 as its parts like this, the angle θ2 that the first straight part of the outside circumference edge R30b of the slot 5b makes with the second straight part thereof is smaller than the curvature radius of the outside circumference edge R30a of the slot 5a of Embodiment 1. Since the bridge part radial dimension is broad and its area is large compared with those of the slot 5a of Embodiment 1 due to this structure, the magnetic flux 71a hardly makes the magnetization reach its saturation level even in a case where the magnetic flux 70 which originates from the stator 9 is stronger, the magnetic flux 71a being the magnetic flux flowing in the bridge part near the outer side of the rotor iron core 4, the bridge part radial dimension being the radial distance between the outer side of the rotor iron core 4 and the outside circumference edge R30b.

As described above, the squirrel-cage rotor according to Embodiment 2 has sufficient areas of bridge parts near the outer side of the rotor iron core 4. Therefore, it realizes the high torque, the magnetization hardly saturates even in a case where the magnetic flux from the stator 9 is strong, and it is possible to make the magnetic flux in the rotor iron core 4 close to its ideal flow, which thereby improves the rotation efficiency.

When the characteristics of the above-described squirrel-cage rotors according to Embodiment 1 and Embodiment 2 are taken into account, it is preferable to choose the slot 5a of Embodiment 1, which is suitable for the conductor bar 7b, which is the secondary conductor, to keep its cross-sectional area and to realize low resistance, in case the torque is relatively small and the magnetization hardly saturates, while it is preferable to choose the slot 5b of Embodiment 2, which is suitable for the magnetic flux to flow through a path with its sufficient cross-sectional area, in case the torque is high and the magnetization easily saturates.

Embodiment 3

Figure 10:
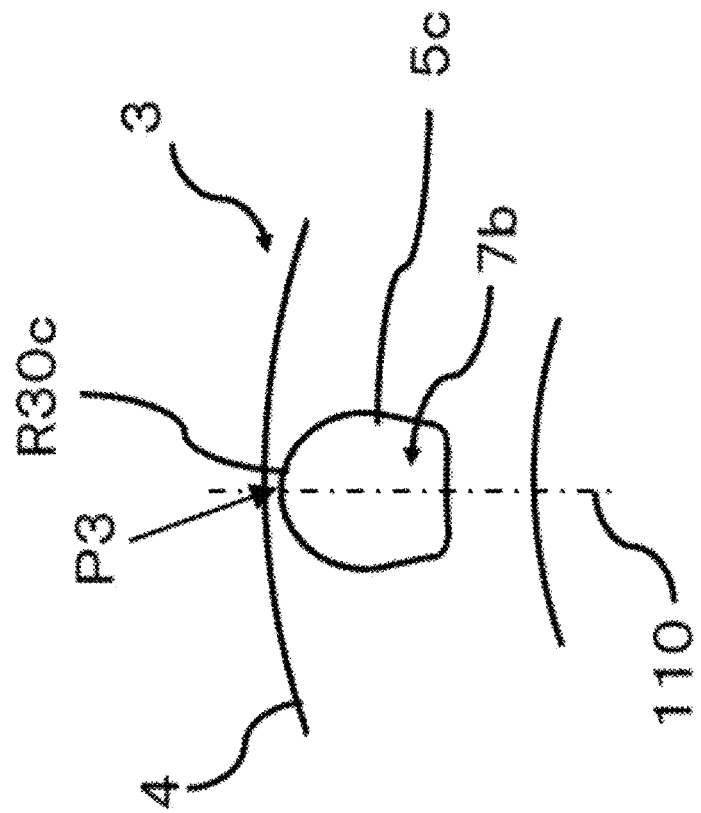
FIG. 10 is a magnified view showing part of a squirrel-cage rotor according to Embodiment 3 of the present disclosure.

FIG. 10 is a magnified cross-sectional view showing part of a squirrel-cage rotor according to Embodiment 3 of the present disclosure. The slot 5c of the squirrel-cage rotor according to Embodiment 3 of the present disclosure has the outside circumference edge whose shape is different from those of the slot 5a and the slot 5b.

The shape of the slot 5c has lateral symmetry about the center line 110 which passes the center of the rotor and an apex P3 that is the midpoint of the outside circumference edge R30c. The outside circumference edge R30c of the slot 5c has a curved shape so as to directly connect the apex P3 of the outside circumference edge R30c of the slot 5c to the first corner R20 and to the second corner R21. In addition, the curvature radius at the apex P3 of the outside circumference edge R30c of the slot 5c is smaller than those at the first corner R20 and the second corner R21.

This structure of the slot 5c of the squirrel-cage rotor according to Embodiment 3 is a relatively simple slot structure, so that it is possible for conductive material to easily fill the slot uniformly when the conductive material is poured into the slot 5c to form a conductor bar 7b, which means there is little chance for the material to form lumps due to heat conduction to the rotor iron core 4.

As described here, the squirrel-cage rotor according to Embodiment 3 has an advantage of easy production due to its simple slot structure in addition to advantages of the squirrel-cage rotor according to Embodiment 1.

As described above, each of the squirrel-cage rotors according to Embodiments 1 to 3 can avoid deformation by stress since it can keep its rigidity against the stress which occurs in its rotor iron core when it rotates. Furthermore, the rotor can realize low resistance of its secondary conductor because of its sufficient slot cross-sectional area, which thereby improves the rotation efficiency. Within the scope of the disclosure, each of the embodiments can be modified or partially omitted according to the object.

DESCRIPTION OF THE SYMBOLS

1: shaft 1a: hollow hole 2: penetrating hole 3: rotor 4: rotor iron core 5a, 5b, 5c: slot 6a: fan-shaped slot 6b: round slot 6c: oval slot 7a: short-circuit ring 7b: conductor bar 8: sleeve 9: stator 10: stator core 11: coil 12: power line 13: housing R20: first corner R21: second corner R22: third corner R23: fourth corner R30a, R30b, R30c: outside circumference edge R31: inside circumference edge L32: first straight part L33: second straight part L40: first side edge L41: second side edge H50, H51: back yoke length 60: distortion 61: stress 70: magnetic flux which originates from the stator 71a: magnetic flux flowing near the rotor outer side 71b: magnetic flux flowing in part of the fan-shaped slot 71c: magnetic flux flowing in a tooth part of the rotor iron core 71d: magnetic flux flowing in back yoke part of the rotor iron core 100: rotation axis 110: center line 200: rotating electric machine.

The invention claimed is:
1. A squirrel-cage rotor comprising:
a shaft lying along an axial direction; and a rotor iron core that has a cylindrical shape, the rotor iron core being a group of laminations of circular plate parts, each of the circular plate parts having a circular hole at its center, the circular plate parts being stacked in the axial direction with the shaft passing through their circular holes, the rotor iron core having more than one slot which is arranged at regular intervals along a circumference side of the rotor iron core, the slot extending along the axial direction, the slot having an outside circumference edge which is positioned near an outer side of the rotor iron core, the outside circumference edge having a first corner at its one end, the outside circumference edge having a second corner at the other end thereof, the outside circumference edge having a shape which expands toward the outer side beyond a first virtual circle, the first virtual circle connecting the first corner and the second corner, the first virtual circle being concentric with the rotor iron core, an inside circumference edge which is positioned near an inner side of the rotor iron core, the inside circumference edge having a third corner at its one end, the inside circumference edge having a fourth corner at the other end thereof, the third corner having a curvature radius smaller than that of the first corner, the fourth corner having a curvature radius smaller than that of the second corner, the inside circumference edge having a shape which expands toward the outer side beyond a second virtual circle, the second virtual circle connecting the third corner and the fourth corner, the second virtual circle being concentric with the rotor iron core, a first side edge which connects the first corner and the third corner, and a second side edge which connects the second corner and the fourth corner.

2. The squirrel-cage rotor according to claim 1, wherein the outside circumference edge includes a first straight part which connects a top part of the outside circumference edge with the first corner and a second straight part which connects the top part of the outside circumference edge with the second corner.

3. The squirrel-cage rotor according to claim 1, wherein a curvature radius at the apex of the outside circumference edge is smaller than those at the first corner and the second corner.

4. A rotating electric machine comprising the squirrel-cage rotor according to claim 1.

5. A rotating electric machine comprising the squirrel-cage rotor according to claim 2.

6. A rotating electric machine comprising the squirrel-cage rotor according to claim 3.

7. The rotating electric machine according to claim 4, wherein a sleeve is provided between the rotor iron core of the squirrel-cage rotor and the shaft thereof.

8. The rotating electric machine according to claim 5, wherein a sleeve is provided between the rotor iron core of the squirrel-cage rotor and the shaft thereof.

9. The rotating electric machine according to claim 6, wherein a sleeve is provided between the rotor iron core of the squirrel-cage rotor and the shaft thereof.

* * * * *